(12) United States Patent
Kurek et al.

(10) Patent No.: US 7,853,215 B2
(45) Date of Patent: Dec. 14, 2010

(54) COMMUNICATION CIRCUIT AND METHOD FOR SELECTING A REFERENCE LINK

(75) Inventors: Wojciech Kurek, Vernon Hills, IL (US); Joseph Cramer, III, Woodstock, IL (US); Bin Hu, Crystal Lake, IL (US)

(73) Assignee: Motorola, Inc., Schaumburg, IL (US)

( * ) Notice: Subject to any disclaimer, the term of this patent is extended or adjusted under 35 U.S.C. 154(b) by 1761 days.

(21) Appl. No.: 10/683,627

(22) Filed: Oct. 10, 2003

(65) Prior Publication Data

US 2005/0079823 A1 Apr. 14, 2005

(51) Int. Cl.
*H04B 17/00* (2006.01)

(52) U.S. Cl. .................. 455/67.11; 455/67.13; 455/442; 455/436; 455/501; 455/63.1; 455/522; 370/311; 370/318; 370/331; 370/335; 370/342; 370/133; 370/141

(58) Field of Classification Search .................. 455/442, 455/437, 436, 522, 63.1, 435.1, 461, 67.11, 455/450, 552.1, 561, 501, 67.13; 370/331, 370/335, 337, 311, 318; 379/349

See application file for complete search history.

(56) References Cited

U.S. PATENT DOCUMENTS

| 5,790,528 | A | * | 8/1998 | Muszynski | .................. | 370/331 |
|---|---|---|---|---|---|---|
| 5,883,888 | A | * | 3/1999 | St-Pierre | ..................... | 370/331 |
| 5,914,946 | A | * | 6/1999 | Avidor et al. | ................ | 370/336 |
| 6,055,428 | A | * | 4/2000 | Soliman | ...................... | 455/437 |
| 6,075,974 | A | * | 6/2000 | Saints et al. | ................... | 455/69 |
| 6,088,399 | A | * | 7/2000 | Luz et al. | ..................... | 375/260 |
| 6,101,179 | A | * | 8/2000 | Soliman | ...................... | 370/342 |
| 6,144,652 | A | * | 11/2000 | Avidor et al. | ................ | 370/336 |
| 6,151,311 | A | * | 11/2000 | Wheatley et al. | ............ | 370/335 |
| 6,151,502 | A | * | 11/2000 | Padovani et al. | ............ | 455/442 |
| 6,154,638 | A | * | 11/2000 | Cheng et al. | ............. | 455/67.11 |
| 6,160,839 | A | * | 12/2000 | Zhang | ........................ | 375/130 |

(Continued)

FOREIGN PATENT DOCUMENTS

EP 1351535 A 10/2003

OTHER PUBLICATIONS

3rd Generation Partnership Project; 3GPP TS 25.211 v3.12.0—3rd Generation Partnership Project; Technical Specification Group Radio Access Network; Physical Channels and Mapping of Transport Channels onto Physical Channels (FDD) (Release1999); Copyright 2002; Valbonne, France.

(Continued)

*Primary Examiner*—Marceau Milord
(74) *Attorney, Agent, or Firm*—Vedder Price P.C.

(57) ABSTRACT

A communication circuit (10) and method updates an active link set list (50) in an asynchronous wireless communication system. In one embodiment, the communication circuit (10) may be a wireless device (600) or any other suitable communication device. The communication circuit (10) includes candidate reference link determination circuitry (30) to receive an active link set update message (60) and in response, to create the candidate list of reference links (20) from the active link set list (50). The candidate reference link determination circuitry (30) creates the candidate list of reference links based on, for example, an indication in the received active link set update message (60) to retain links from the active link set list (50).

24 Claims, 4 Drawing Sheets

U.S. PATENT DOCUMENTS

| | | | |
|---|---|---|---|
| 6,236,860 B1 * | 5/2001 | Hagting et al. | 455/436 |
| 6,311,070 B1 * | 10/2001 | Tong et al. | 455/522 |
| 6,324,206 B1 * | 11/2001 | Rotstein et al. | 375/140 |
| 6,334,047 B1 * | 12/2001 | Andersson et al. | 455/69 |
| 6,535,739 B1 * | 3/2003 | Chen et al. | 455/437 |
| 6,556,827 B1 * | 4/2003 | Oh | 455/426.2 |
| 6,594,241 B1 * | 7/2003 | Malmlof | 370/329 |
| 6,618,365 B1 * | 9/2003 | Vannatta et al. | 370/333 |
| 6,628,960 B1 * | 9/2003 | Tolson et al. | 455/552.1 |
| 6,708,041 B1 * | 3/2004 | Butovitsch et al. | 455/522 |
| 6,717,924 B2 * | 4/2004 | Ho et al. | 370/311 |
| 6,760,303 B1 * | 7/2004 | Brouwer | 370/229 |
| 6,845,238 B1 * | 1/2005 | Muller | 455/436 |
| 6,853,843 B2 * | 2/2005 | Chen et al. | 455/437 |
| 6,965,585 B2 * | 11/2005 | Grilli et al. | 370/331 |
| 6,996,081 B1 * | 2/2006 | Brouwer | 370/335 |
| 7,003,290 B1 * | 2/2006 | Salonaho et al. | 455/423 |
| 7,016,325 B2 * | 3/2006 | Beasley et al. | 370/331 |
| 7,061,985 B2 * | 6/2006 | Le Van Suu | 375/259 |
| 7,177,658 B2 * | 2/2007 | Willenegger et al. | 455/522 |
| 7,184,419 B2 * | 2/2007 | Hwang et al. | 370/331 |
| 7,254,118 B1 * | 8/2007 | Terasawa et al. | 370/328 |
| 7,315,741 B2 * | 1/2008 | Chun | 455/436 |
| 7,321,780 B2 * | 1/2008 | Love et al. | 455/522 |
| 7,409,214 B2 * | 8/2008 | Lee | 455/436 |
| 7,433,321 B2 * | 10/2008 | Grilli et al. | 370/252 |
| 7,433,334 B2 * | 10/2008 | Marjelund et al. | 370/329 |
| 2003/0128683 A1 | 7/2003 | Duncan Ho et al. | |

OTHER PUBLICATIONS

"Universal Mobile Telecommunications system (UMTS)"; ETSI Standards, European Telecommunications Standards Institute, Sophia-Antipo, Fr.; vol. 3-R2, No. V560; Sep. 2003; Section 8.3.4.3.

"Universal Mobile Telecommunications system (UMTS)"; ETSI Standards, European Telecommunications Standards Institute, Sophia-Antipo, Fr.; vol. 3-R4, No. V580; Sep. 2003; Section 7.1.2.

Supplementary European Search Report for Application No. 04789454.8; dated Jul. 20, 2007; pp. 1-4.

* cited by examiner

COMMUNICATION CIRCUIT AND METHOD FOR SELECTING A REFERENCE LINK

FIELD OF THE INVENTION

The invention relates generally to wireless communication systems, and more particularly to asynchronous wireless communication systems.

BACKGROUND OF THE INVENTION

A wireless communication system includes a number of base stations, scattered over a geographic area, to provide service for a number of wireless devices, such as personal data assistants (PDAs), cellular phones, pagers, smart phones and other suitable devices that can move throughout a geographic area. Communication between the base stations in the wireless communication system may be either intercell synchronous or intercell asynchronous. The base stations in an intercell synchronous system are synchronized with each other, whereas the base stations in an intercell asynchronous system are not synchronized with each other. Additionally, the base stations in an intercell asynchronous system do not share a common time reference, and as a result these base stations transmit messages at unsynchronized times relative to each other. Interim Standard IS-95-A is one example of an intercell synchronous system. The wideband code division multiple access (WCDMA) standard is an example of an intercell asynchronous system.

The base stations generally serve as nodes in the wireless communication system, from which links are established between the wireless devices and each base station. Each base station may establish a link with a wireless device by allocating one or more control channels and one or more dedicated channels to the link. A control channel is used for transmitting base station identification and paging information. The dedicated channel may, for example, include a traffic channel to carry voice and data information between the wireless device and the base station. Accordingly, each link represents collectively one or more control channels and one or more dedicated channels to provide communication between the wireless device and each base station.

Synchronization of wireless devices in an asynchronous communication system is commonly achieved by transmitting one or more synchronization signals from each base station to a wireless device. The transmitted synchronization signals provide a timing reference for synchronizing the wireless device's despreading operations. For example, in a WCDMA-compliant system, a common synchronization procedure utilizes synchronization channels (or a code from a common set of synchronization codes, such as a set of downlink pseudonoise (PN) codes) associated with the control channel on a corresponding link. The asynchronous wireless communication system maintains the synchronization channels for each base station in the system. Additionally, each base station maintains a list of neighboring cells and their corresponding synchronization channels for broadcast in each cell.

Soft handovers allow the wireless device to establish links with multiple base stations simultaneously. In order to facilitate a soft handover, the wireless network directs each base station to adjust its transmit signal to the wireless device in an aligned manner such that the wireless device may simultaneously communicate with each base station. As the wireless device travels through the wireless communication system, the wireless device constantly scans for base stations in order to identify potential handover candidates. For example, during a call, or during any other suitable time such as during a registration procedure, as known in the art, the wireless device maintains an active link set list corresponding to the links in use during the soft handover. The wireless device provides measurements, such as signal strength, quality measurements and timing information to the base station for each of the links in the active link set list. The base station then evaluates the measurements and provides an active link set update message to the wireless device to add or delete links during the soft handover.

Asynchronous systems facilitate a soft handover by synchronizing communication between the links established with the wireless device and each corresponding base station. Each base station transmits respective control channel synchronization information over a corresponding link at unsynchronized times relative to each other. One link is selected as a reference link such that the other links are time adjusted to be aligned with the reference link. The wireless device in a soft handover calculates and reports to the wireless communication system the time difference between a current reference link corresponding to a current reference base station, and a new link corresponding to the new base station. The wireless communication system notifies the new base station of the time difference between the links. The new base station can then adjust its receive and transmit timing according to the signal intended for the wireless device in order to compensate for the time difference between the current reference link associated with the current base station and the new link associated with the new base station.

During the soft handover procedure, the wireless device adds and deletes links in order to provide optimum communication between the wireless device and the wireless communication system. For example, the wireless device may add or delete links due to a time-varying signal quality, due to a movement of a user, changes in interference levels, or changes in the propagation environment. Adding and deleting links may be performed by periodically transmitting an active link set update message to modify an active link set list. As is known in the art, newly established links are determined for each frame based on the links from the previous frame and any additions or deletions relative to the current frame.

According to one method, when the wireless device receives the active link set update message, the wireless device adds and deletes links in the order in which the links are provided in the active link set update message, as long as the active set is not full. If the active link set update message requires the wireless device to delete the current reference link, the wireless device will select an alternative link in the active link set list. If, however, the reference link is also marked for deletion in the active link set update message, then the wireless device will have needlessly selected a reference link just to have it removed in response to the active link set update message. Accordingly, the wireless device will then have to reselect another reference link.

BRIEF DESCRIPTION OF THE DRAWINGS

The present invention is illustrated, by way of example and not limitation, in the accompanying figures, in which like reference numerals indicate similar elements, and in which.

DETAILED DESCRIPTION OF THE PREFERRED EMBODIMENTS

A communication circuit and method updates an active link set list in an asynchronous wireless communication system. The communication circuit may be a wireless device or any other suitable communication device. The communication circuit includes candidate reference link determination circuitry to receive an active link set update message and in response to create the candidate list of reference links from the active link set list. The candidate reference link determination circuitry creates the candidate list of reference links based on, for example, an indication in the received active link set updated message to retain links from the active link set list.

According to one embodiment, the candidate reference link determination circuitry selects a new reference link from the candidate list of reference links based on, for example, a strongest signal strength indication. Alternatively, the candidate reference link determination circuitry may select the new reference link based on a quality indication or an indication of a distance to a base station, an aging indication associated with each of the candidate reference links, or a timing offset. Accordingly, if the active link set update message indicates the removal of a current reference link from the active link set list, the candidate reference link determination circuitry may facilitate a soft handover by selecting an appropriate new reference link from the candidate list of reference links. According to one embodiment of the invention, the communication circuit preprocesses the active link set update message in order to select a new reference link such that the new reference link is not removed during the active link set update.

Among other advantages, the present invention improves the selection of a reference link. As previously described, if the candidate reference link determination circuitry selects a link as a reference link and the active link set update message requires that the link selected as a reference link is removed, then the candidate reference link determination circuitry must reselect another reference link. Consequently, the selection of a new reference link may result in the selection of two or more reference links in response to receiving the active link set update message. In other words, the candidate reference link determination circuitry selects more than one reference link during an active set update. Since the communication circuit preprocesses the active link set update message before updating the active link set list, the candidate reference link determination circuitry may avoid the selection of a link as a reference link that would subsequently be removed as a reference link prior to the next active link set update message.

Preprocessing the active link set update message allows the candidate reference link determination circuitry to select a new reference link no more than once during an active set update, regardless of the number of link additions and link removals indicated in the active link set update message. Additionally, since each change of the reference link takes time to process, the processing requirements and the processing time for reselecting a new reference link and for updating the active link set list is reduced. Furthermore, since the reference link reselection process may require several measurements, the probability of erroneously selecting a new reference link is reduced, since there is a probability of error associated with each measurement. Therefore, decreasing the number of measurements required further decreases the probability of erroneously selecting a new reference link.

Figure 1:
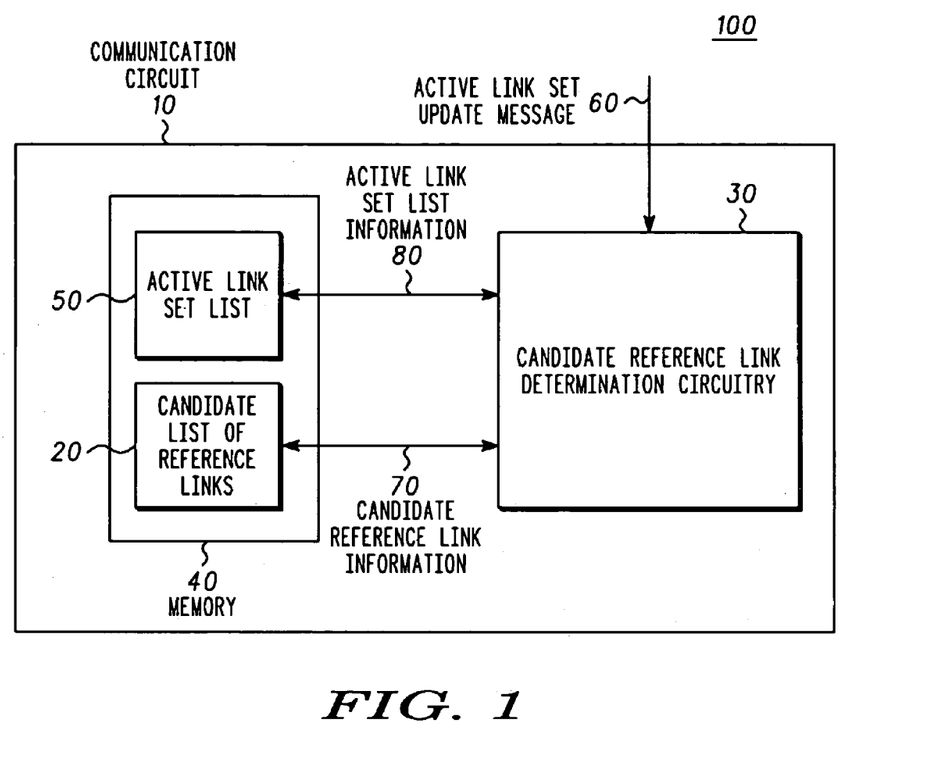
FIG. 1 is a block diagram illustrating one example of a circuit for creating a candidate list of reference links according to one embodiment of the invention.

FIG. 1 is a block diagram illustrating one exemplary embodiment of a communication circuit 10 for creating a candidate list of reference links according to one embodiment of the invention. The communication circuit 10 includes candidate reference link determination circuitry 30 and memory 40. The memory 40 may be, for example, random access memory (RAM), read only memory (ROM), optical memory, or any suitable storage medium located locally or remotely such as via a server. Additionally, the memory 40 may be accessible by a base station, switching system, or any suitable network element via the Internet, a wide access network (WAN), a local area network (LAN), a wireless wide access network (WWAN), a wireless local area network (WLAN), an IEEE 802.11 wireless network, a bluetooth network or any suitable communication interface or network. The memory 40 includes a candidate list of reference links 20 and an active link set list 50. The candidate reference link determination circuitry 30 receives an active link set update message 60 and in response creates the candidate list of reference links 20 based on the active link set list 50 and the received active link set update message 60.

The candidate reference link determination circuitry 30 may be one or more suitably programmed processors, such as a microprocessor, a microcontroller or a digital signal processor (DSP), and therefore includes associated memory, such as memory 40, that contains executable instructions that when executed causes the candidate reference link determination circuitry 30 to carry out the operations described herein. Alternatively, as used herein, the candidate reference link determination circuitry 30 includes discrete logic, state machines or any other suitable combination of hardware, software and/or firmware. The candidate reference link determination circuitry 30 produces candidate reference link information 70 and stores the candidate list of reference links 20 into memory 40. Similarly, the candidate reference link determination circuitry 30 produces active link set list information 80 and stores the active link set list 50 into memory 40.

Figure 2:
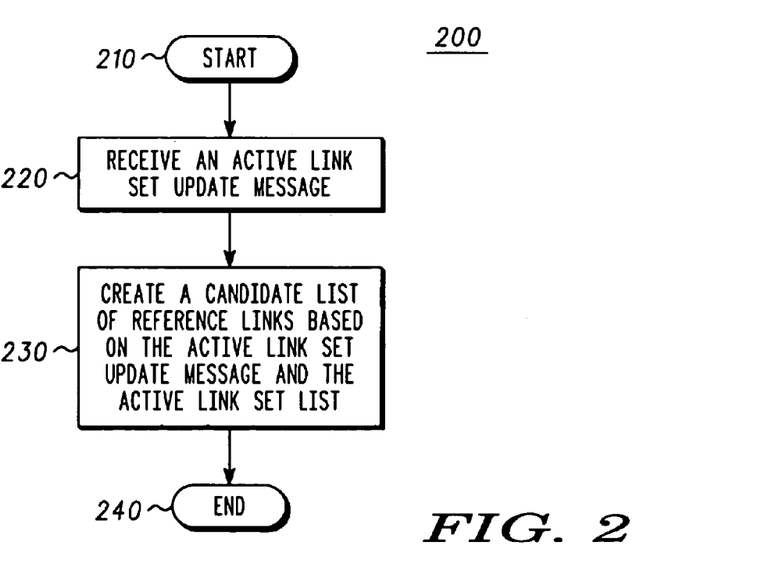
FIG. 2 is a flowchart illustrating one example of a method for producing a candidate list of reference links according to one embodiment of the invention.

FIG. 2 is a flowchart illustrating one example of a method 200 for producing the candidate list of reference links 20 according to one embodiment of the invention. The method 200 may be carried out by the candidate reference link determination circuitry 30 in the communication circuit 10. However, any other suitable structure may be used. It will be recognized that method 200, beginning with step 210, will be described as a series of operations, however the operations may be performed in any suitable order and may be repeated in any suitable combination.

As shown in step 220, the candidate reference link determination circuitry 30 receives the active link set update message 60. The active link set update message 60 may indicate to the candidate reference link determination circuitry 30 to add or delete links via the active link set update message 60 to provide optimum communication between the communication circuit 10 and the asynchronous wireless communication system. The active link set update message 60 may indicate to the candidate reference link determination circuitry 30 link additions or links deletions due to, for example, a time varying signal quality, movement of a user, changes in interference levels, changes in the propagation environment, or due to any other suitable parameter.

As shown in step 230, the candidate reference link determination circuitry 30 creates the candidate list of reference links 20 based on the active link set update message 60 and the active link set list 50. For example, the candidate reference link determination circuitry 30 may generate the candidate list of reference links 20 based on determining which links are to be retained from the active link set list 50. Such a determination may be made by comparing the links currently in the active link set list 50 with one or more indications of links to be removed in the active link set update message 60. Although the method 200 is shown as ending at step 240, according to one embodiment the process may return to step 220 and repeat as necessary.

Figure 3:
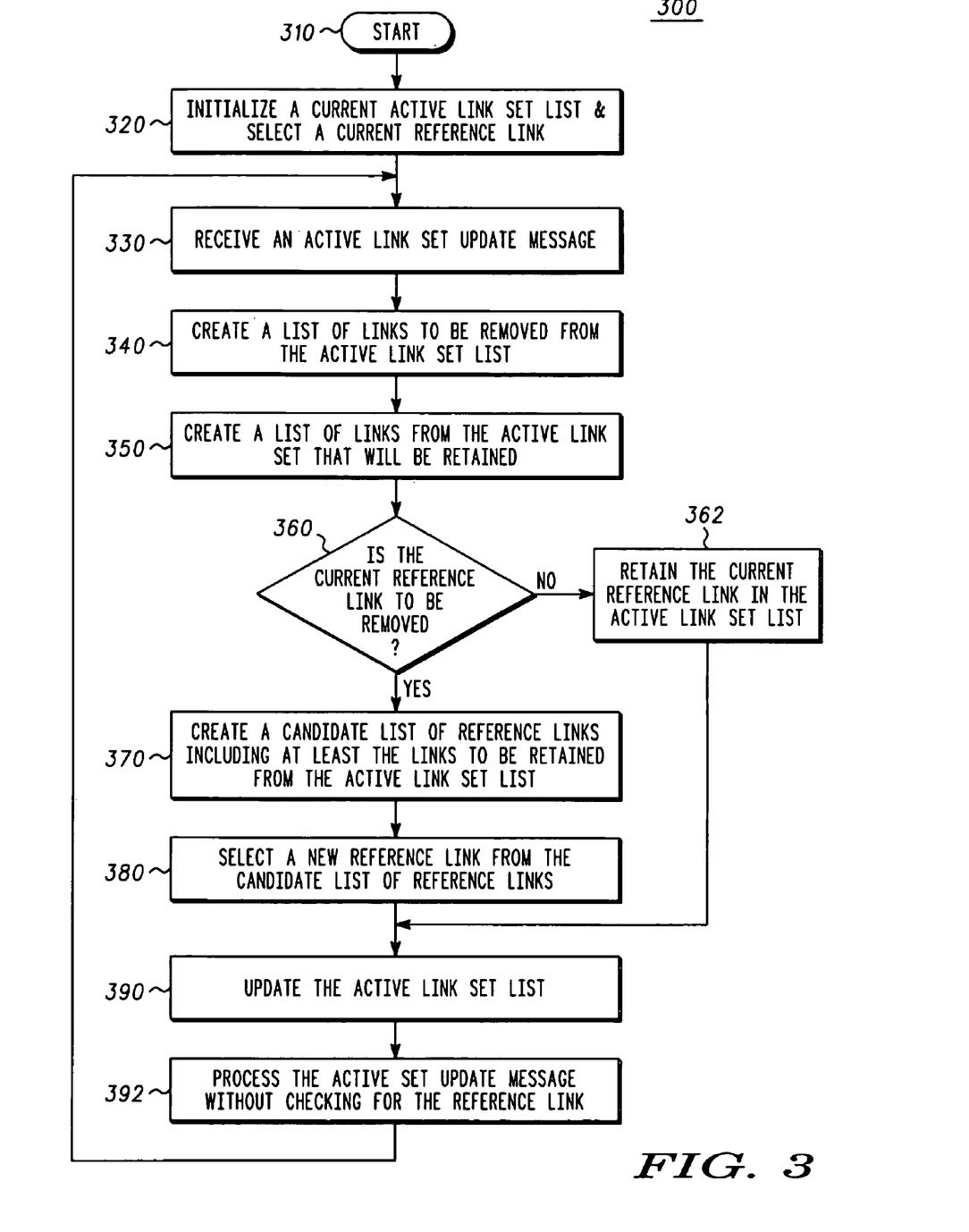
FIG. 3 is a flowchart illustrating another example of a method for creating a candidate list of reference links according to another embodiment of the invention.

FIG. 3 is a flowchart illustrating another example of a method 300 for creating the candidate list of reference links 20 according to another embodiment of the invention. The method 300 may be carried out by the candidate reference link determination circuitry 30 in communication circuit 10. However, any other suitable structure may be used. It may be recognized that method 300, beginning with step 310, will be described as a series of operations, however, the operations may be performed in any suitable order and may be repeated in any suitable combination.

As shown in step 320, the candidate reference link determination circuitry 30 initializes the current active link set list 50 and selects a current reference link. For example, if the communication circuit 10 registers with a base station, the base station may provide the active link set list 50 and an indication of a reference link to the candidate reference determination circuitry 30 for storage into memory 40 as is known in the art. Accordingly, the candidate reference link determination circuitry 30 may select the reference link based on the active link set list 50.

As shown in step 330, the candidate reference link determination circuitry 30 receives the active link set update message 60 as previously described at step 220 of FIG. 2. As previously described, the active link set update message 60 includes link additions and/or link deletions.

As shown in step 340, the candidate reference link determination circuitry 30 creates a list of links to be removed from the active link set list 50. For example, the candidate reference link determination circuitry 30 may determine the links to be removed from active link set list 50 by determining which links are indicated to be removed in the active link set update message 60.

As shown in step 350, the candidate reference link determination circuitry 30 creates a list of links from the active link set list 50 that will be retained. For example, the candidate reference link determination circuitry 30 may determine the links from the active link set list 50 that will be retained based on determining all the current links in the active link set list 50 and then determining the links to be removed as previously determined in step 340.

As shown in step 360, the candidate reference link determination circuitry 30 determines if the current reference link is to be removed. For example, the candidate reference link determination circuitry 30 may determine if the current reference link is to be removed based on determining if the current reference link is indicated as being removed in the active link set update message 60.

As shown in step 370, if the active link set update message 60 indicates that the current reference link is to be removed, then the candidate reference link determination circuitry 30 creates the candidate list of reference links 20. According to one embodiment of the invention, the candidate reference link determination circuitry 30 creates the candidate list of reference links 20 based on the list of links from the active link set list 50 that will be retained as determined in step 350. For example, the candidate reference link determination circuitry 30 may determine the list of links that will be retained by removing the list of links indicated to be removed from the active link set list 50 as previously determined in step 340. If the candidate reference link determination circuitry 30 determines that the current reference link is not to be removed as shown in step 362, the candidate reference link determination circuitry 30 retains the current reference link in the active link set list 50 and processing continues as shown at step 390.

As shown in step 380 the candidate reference link determination circuitry 30 selects a new reference link from the candidate list of reference links 20 based on, for example, a signal strength indication associated with each link in the candidate list of reference links 20, a quality indication associated with each link in the candidate list of reference links 20, and indication of a distance to a base station associated with each link in the candidate list of reference links 20, an aging indication associated with each of the candidate list of reference links, an indication of a timing offset associated with each link in the candidate list of reference links 20, or any other suitable parameter. For example, since the candidate reference link determination circuitry 30 has determined that a new reference link is required, the candidate reference link determination circuitry 30 selects one of the links as a reference link based on the criteria described above or any other suitable criteria. According to one embodiment, the candidate reference link determination circuitry 30 maintains the current reference link until the candidate reference link determination circuitry 30 selects the new reference link. Maintaining the current reference link until the new reference link is selected allows the communication circuit 10 to maintain synchronization while the candidate reference link determination circuitry 30 is transitioning to the new reference link.

As shown in step 390, the candidate reference link determination circuitry 30 updates the active link set list 50 based on at least the received active link set update message 60. According to one embodiment, the candidate reference link determination circuitry 30 updates the active link set list 50 based on the new reference link selected in step 380. Further, the candidate reference link determination circuitry 30 may update the active link set list 50 based on the list of links to be removed from the active link set list 50 determined at step 340.

As shown in step 392, the communication circuit 10 processes the active link set update message 60 without checking for the reference link. Since the candidate reference link determination circuitry 30 has already selected the new reference link at step 380, the communication circuit 10 may add and delete the remaining links in the active link set update message 60 without having to select the new reference link.

Figure 4:
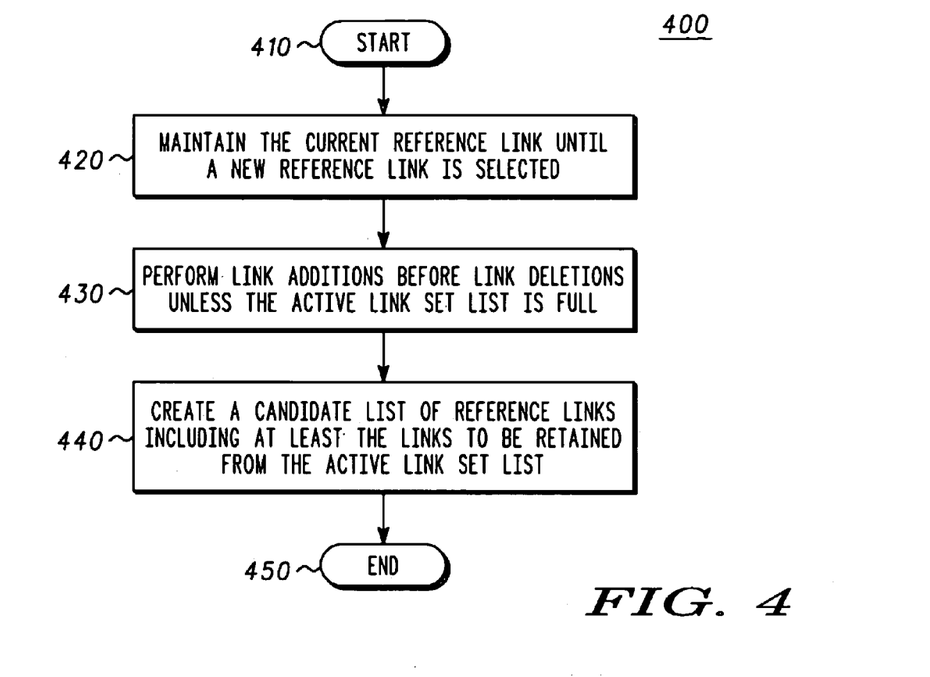
FIG. 4 is a flowchart illustrating one example of a method for creating the candidate list of reference links according to one embodiment of the invention.

FIG. 4 illustrates a method 400 for creating the candidate list of reference links 20 as shown in step 370 of FIG. 3 in more detail. The method 400 may be carried out by the candidate reference link determination circuitry 30 in the communication circuit 10, however, any other suitable structure may be used. It will be recognized that method 400, beginning with step 410 will be described as a series of operations, however, the operations may be performed in any suitable order and may be repeated in any suitable combination.

As shown in step 420, the candidate reference link determination circuitry 30 maintains the current reference link until a new reference link is selected. Accordingly, the candidate reference link determination circuitry 30 will not prematurely remove the current reference link resulting in a situation where no reference link is available in order to support ongoing dedicated connection operations, such as a soft handover.

As shown in step 430, the candidate reference link determination circuitry 30 performs link additions before performing link deletions, unless the active link set list 50 is full. The active link set list 50 may have a limited amount of storage capacity and therefore may be able to store only a limited number of link addition and deletion indications. Accordingly, the active link set list 50 becomes full when the number of link addition and deletion indications equals the storage capacity of the active link set list 50. Performing link additions before link deletions avoids the problem of removing links which would result in no links left in the active link set list 50 at any point in time. However, if the active link set list 50 is full, then one or more link deletions indicated in the active link set update message may be performed since link additions cannot be performed under that condition.

As shown in step 440, the candidate reference link determination circuitry 30 creates the candidate list of-reference links 20 including at least the links to be retained from the active link set list 50. At step 450, the current candidate list of reference links are selected and therefore, processing of the candidate list of reference links 20 may end. Alternatively, processing of the candidate list of reference links 20 may continue, for example, to step 380 as shown in FIG. 3.

Figure 5:
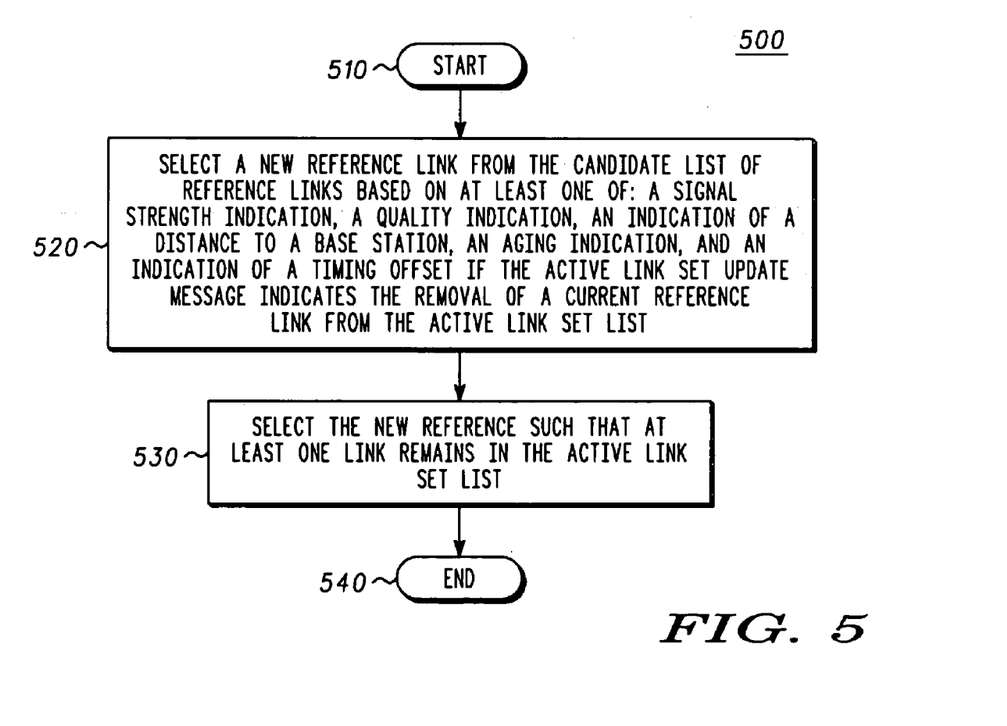
FIG. 5 is a flowchart illustrating one example of a method for selecting a new reference link according to one embodiment of the invention.

FIG. 5 illustrates a method 500 for selecting a new reference link according to one embodiment of the invention. The method 500 may be carried out by the candidate reference link determination circuitry 30 in the communication circuit 10. However, any other suitable structure may be used. It will be recognized that method 500, beginning with step 510 will be described as a series of operations, however, the operations may be performed in any suitable order any may be repeated in any suitable combination.

As shown in step 520, the candidate reference link determination circuitry 30 selects a new reference link from the candidate list of reference links 20 based on at least one of: a signal strength indication, a quality indication, a distance to a base station, an aging indication associated with each of the candidate list of reference links, and an indication of a timing offset if the active link set update message 60 indicates the removal of a current reference link from the active link set list 50. As shown in step 530, the candidate reference link determination circuitry 30 selects the new reference link, as previously described, such that at least one link remains in the active link set list.

Figure 6:
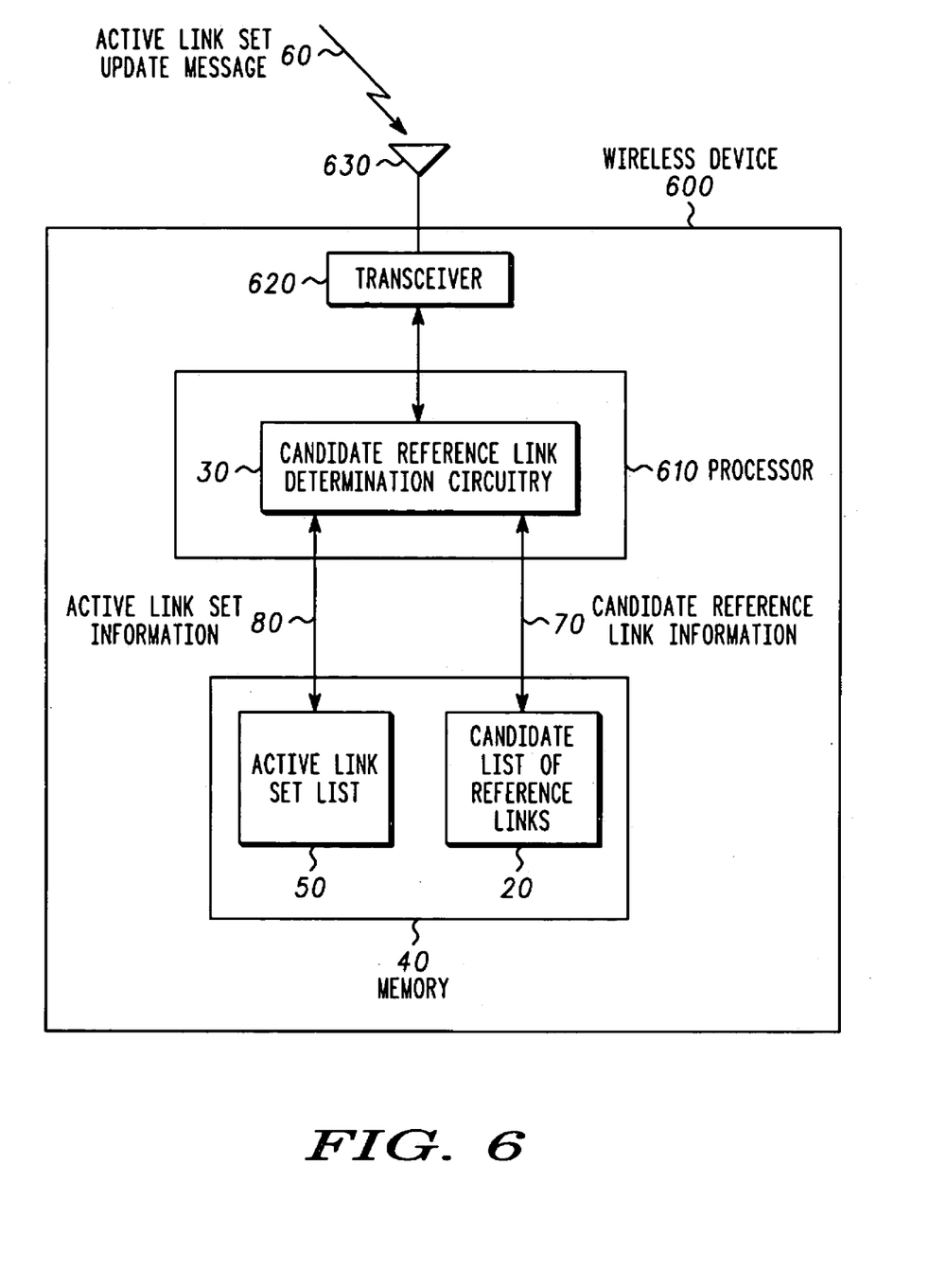
FIG. 6 is a block diagram illustrating an example of a wireless device for creating a candidate list of reference links according to one exemplary embodiment of the invention.

FIG. 6 is block diagram illustrating one example of a wireless device 600 for creating a candidate list of reference links according to another exemplary embodiment of the invention. According to this embodiment, wireless device 600 includes a processor 610, a transceiver 620, and memory 40. Additionally, wireless device 600 is coupled to an antenna 630. Processor 610 includes the candidate reference link determination circuitry 30 for receiving the active link set update message 60 via antenna 630 and transceiver 620.

The processor 610 may be one or more-suitably programmed processors such as a micro-processor, a microcontroller, or a digital signal processor (DSP) and therefore, includes associated memory, such as memory 40, that contains executable instructions that when executed causes the processor 610 to carry out the operations described herein. Alternatively, as used herein, the processor 610 includes discrete logic, state machines or any other suitable combination of hardware, software and/or firmware. Wireless device 600 may be a cellular phone, a personal data assistant (PDA), a satellite phone, a pager, a wireless portable computer, or any other suitable device that can create a candidate list of reference links based on the active link set list 50 and the received active link set update message 60.

Among other advantages, the present invention improves the selection of a reference link. As previously described, if the candidate reference link determination circuitry 30 selects a link as a reference link and the active link set update message 60 requires that the link selected as a reference link is removed, then the candidate reference link determination circuitry 30 must reselect another reference link. Consequently, the selection of a new reference link may result in the selection of two or more reference links in response to receiving the active link set update message 60. In other words, the candidate reference link determination circuitry selects more than one reference link during an active set update. Since the communication circuit preprocesses the active link set update message before updating the active link set list 50, the candidate reference link determination circuitry may avoid the selection of a link as a reference link that would subsequently be removed as a reference link prior to the next active link set update message 60.

Preprocessing the active link set update message 60 allows the candidate reference link determination circuitry 30 to select a new reference link no more than once during an active set update, regardless of the number of link additions and link removals indicated in the active link set update message 60. Additionally, since each change of the reference link takes time to process, the processing requirements and the processing time for reselecting a new reference link and for updating the active link set list 50 is reduced. Furthermore, since the reference link reselection process requires several measurements, the probability of erroneously selecting a new reference link is reduced, since there is a probability of error associated with each measurement. Therefore, decreasing the number of measurements required further decreases the probability of erroneously selecting a new reference link.

It should be understood that the implementation of other variations and modifications of the invention and its various aspects will be apparent to those of ordinary skill in the art and that the invention is not limited by this specific embodiment described. It is therefore contemplated to cover by the present invention any and all modifications, variations or equivalents that fall within the spirit and scope of the basic underlying principles disclosed and claimed herein.

What is claimed is:

1. A communication circuit operative to update an active link set list in an asynchronous wireless communication system comprising:
   candidate reference link determination circuitry operative to receive an active link set update message, and in response, to create a candidate list of a plurality of reference links to be used as time reference links based on the active link set list and the received active link set update message.

2. The communication circuit of claim 1 wherein the candidate reference link determination circuitry is operative to create the candidate list of reference links based on at least an indication in the received active link set update message to retain links from the active link set list.

3. The communication circuit of claim 2 wherein the candidate list of reference links includes at least the links to be retained in the active link set list as indicated in the active set update message if the active link set update message indicates the removal of a current reference link from the active link set list.

4. The communication circuit of claim 1 wherein the candidate reference link determination circuitry is operative to update the active link set list based on at least the received active link set update message.

5. The communication circuit of claim 1 wherein the candidate reference link determination circuitry is operative to maintain a current reference link until the candidate reference link determination circuitry selects a new reference link.

6. A wireless device operative to update an active link set list in an asynchronous wireless communication system comprising:
   a transceiver operative to receive an active link set update message;
   candidate reference link determination circuitry, operatively coupled to the transceiver, and operative to receive the active link set update message, and in response, to create a candidate list of a plurality of reference links to be used as time reference links based on the active link set list and the received active link set update message; and
   memory, operatively coupled to the candidate reference link determination circuitry, and operative to store the candidate list of reference links.

7. The wireless device of claim 6 wherein the candidate reference link determination circuitry is operative to create the candidate list of reference links based on at least an indication in the received active link set update message to retain links from the active link set list, and wherein the memory contains the candidate list of reference links.

8. The wireless device of claim 7 wherein the candidate list of reference links includes at least the links to be retained in the active link set list if the active link set update message indicates the removal of a current reference link from the active link set list.

9. A wireless device operative to update an active link set list in an asynchronous wireless communication system comprising:
   a transceiver operative to receive an active link set update message;
   candidate reference link determination circuitry, operatively coupled to the transceiver, and operative to receive the active link set update message, and in response, to create a list of links to be removed from the active link set list and a list of links not to be removed from the active link set list in response to the received active link set update message, and to create a candidate list of reference links to include at least the list of links to be retained from the active link set list, but not the list of links to be removed from the active link set list, such that the candidate reference link determination circuitry is operative to select a new reference link from the candidate list of reference links, if the received active link set update message indicates the removal of a current reference link from the active link set list; and
   memory, operatively coupled to the candidate reference link determination circuitry, and operative to store the candidate list of reference links.

10. The wireless device of claim 9 such that the candidate reference link determination circuitry is operative to maintain the current reference link until the candidate reference link determination circuitry selects the new reference link.

11. A method for updating an active link set list in an asynchronous wireless communication system, the method comprising:
   receiving an active link set update message; and
   creating a candidate list of a plurality of reference links to be used as time reference links based on the active link set update message and the active link set list.

12. The method of claim 11, wherein creating the candidate list of reference links further includes creating a list of links to be retained from the active link set list.

13. The method of claim 11, further including updating the active link set list based on at least the received active link set update message.

14. A method for updating an active link set list in an asynchronous wireless communication system, the method comprising:
   receiving an active link set update message;
   creating a list of links to be removed from the active link set list and a list of links to be retained from the active link set list in response to the received active link set update message;
   creating a candidate list of reference links including the list of links to be retained from the active link set list but not the list of links to be removed from the active link set list if the received active link set update message indicates the removal of a reference link from the active link set list; and
   selecting a new reference link from the candidate list of reference links based on at least one of a signal strength measurement, a quality indication, an indication of a distance to a base station, an aging indication associated with each of the candidate list of reference links, and an indication of a timing offset.

15. The method of claim 14 wherein creating the candidate list of reference links includes adding the new reference link to the active link set list before removing the current reference link from the active link set list unless the active link set list is full.

16. Memory comprising instructions executable by one or more processing devices that cause the one or more processing devices to:
   receive an active link set update message; and
   create a candidate list of a plurality of reference links to be used as time reference links based on the active link set update message and the active link set list.

17. The memory of claim 16 comprising instructions that cause the one or more processing devices to create at least one of: a list of links to be removed from the active link set list, and a list of links to be retained from the active link set list, in response to the received active link set update message.

18. A communication circuit operative to update an active link set list in an asynchronous wireless communication system comprising:
   candidate reference link determination circuitry operative to receive an active link set update message, and in response, to create a candidate list of reference links based on the active link set list and the received active link set update message; and
   wherein the candidate reference link determination circuitry is operative to select a new reference link from the candidate list of reference links based on at least one of: a signal strength measurement, a quality indication, an indication of a distance to a base station, an aging indication associated with each of the candidate list of reference links, and an indication of a timing offset, if the active link set update message indicates the removal of a current reference link from the active link set list.

19. The communication circuit of claim 18 such that the candidate reference link determination circuitry is operative to maintain the current reference link until the candidate reference link determination circuitry selects the new reference link.

20. The communication circuit of claim 18 such that the candidate reference link determination circuitry is operative to add the new reference link to the active link set list before removal of the current reference link from the active link set list unless the active link set list is full.

21. The communication circuit of claim 18 wherein the active link set update message includes at least one of: an indication of a link addition and an indication of a link deletion, and wherein the candidate reference link determination circuitry selects only one new reference link in response to the received active link set update message.

22. A method for updating an active link set list in an asynchronous wireless communication system, the method comprising:

receiving an active link set update message;

creating a candidate list of reference links based on the active link set update message and the active link set list; and selecting a new reference link from the candidate list of reference links based on at least one of: a signal strength measurement, a quality indication, an indication of a distance to a base station, an aging indication associated with each of the candidate list of reference links, and an indication of a timing offset if the active link set update message indicates the removal of a current reference link from the active link set list.

23. The method of claim 22, such that selecting a new reference link includes maintaining a current reference link until the new reference link is selected.

24. The method of claim 22, wherein creating the candidate list of reference links includes adding the new reference link to the active link set list before removing the current reference link from the active link set list unless the active link set list is full.

* * * * *